(12) United States Patent
Baldwin et al.

(10) Patent No.: US 6,281,440 B1
(45) Date of Patent: Aug. 28, 2001

(54) DECORATIVE FRAME FOR SWITCH PLATES AND THE LIKE

(75) Inventors: Reginald A. Baldwin, Carrollton, TX (US); Gregg A. Ruecker, Wheaton, IL (US)

(73) Assignee: Jackson Deerfield Manufacturing Corporation, Dallas, TX (US)

( * ) Notice: Subject to any disclaimer, the term of this patent is extended or adjusted under 35 U.S.C. 154(b) by 0 days.

(21) Appl. No.: 09/271,739

(22) Filed: Mar. 18, 1999

(51) Int. Cl.[7] .................................................. H02G 3/14
(52) U.S. Cl. .............................. 174/66; 174/67; 220/241; 220/242
(58) Field of Search ..................... 174/66, 67; 220/241, 220/242; 439/135; D13/177

(56) References Cited

U.S. PATENT DOCUMENTS

| | | | |
|---|---|---|---|
| 2,515,820 | * 7/1950 | Clark | 40/2 R |
| 3,609,927 | 10/1971 | Wine | 52/100 |
| 4,479,317 | * 10/1984 | Hanna . | |
| 4,800,239 | 1/1989 | Hill | 174/66 |
| 5,041,698 | * 8/1991 | Takagi et al. | 174/66 |
| 5,763,831 | * 6/1998 | Shotey et al. | 174/67 |
| 5,837,937 | * 11/1998 | Reese et al. | 174/66 |
| 6,051,785 | * 4/2000 | Baldwin et al. | 174/54 |

FOREIGN PATENT DOCUMENTS

| | | | |
|---|---|---|---|
| 2 085 229 | * 4/1982 | (GB) | 174/66 |
| 2116121 | 9/1983 | (GB) | H05K/5/03 |
| 2211997 | 7/1989 | (GB) | H01H/9/02 |
| 2264462 | 9/1993 | (GB) | H05K/5/03 |
| 2266408 | 10/1993 | (GB) | H01H/9/02 |
| 2303966 | 5/1997 | (GB) | H02G/3/08 |
| 0136013 | * 5/1990 | (JP) | 174/66 |

* cited by examiner

Primary Examiner—Dean A. Reichard
Assistant Examiner—Dhiru R. Patel
(74) Attorney, Agent, or Firm—Thompson & Knight; Barry W. Dove

(57) ABSTRACT

A decorative article for mounting about a wall mounted electrical cover plate of a switch or receptacle includes a frame having an inner periphery smaller than the cover plate and an outer periphery larger than the cover plate. The inner periphery defines a central opening. The frame includes a channel extending outwardly of the inner periphery. The channel has a depth substantially equal to the thickness of the cover plate and the channel has an outer periphery substantially the same size as the cover plate. The frame is thus capable of surrounding the cover plate with the switch or receptacle being accessible through the central opening. An adhesive strip is affixed to the frame so that the frame may be adhered directly to the wall around the cover plate or to a back plate positioned between the cover plate and the wall. The back plate has an inner periphery smaller than the cover plate and an outer periphery larger than the cover plate. The cover plate is trapped in the channel between the frame and the back plate.

17 Claims, 1 Drawing Sheet

DECORATIVE FRAME FOR SWITCH PLATES AND THE LIKE

FIELD OF THE INVENTION

The present invention relates generally to the field of decorative articles or surrounds used in connection with wall mounted electrical cover plates, and more particularly to a decorative frame that may be mounted about a cover plate either by affixing the frame directly to the wall or by affixing the frame to a back plate mounted between the wall the cover plate.

DESCRIPTION OF THE PRIOR ART

Rooms in homes and personal work spaces such as offices tend to be initially rather austere. Typically, offices and rooms in homes have simple painted walls and electrical fixtures. Initially, rooms and offices are unfurnished and they may not have window treatments. Many people desire to add unique and distinctive decorative articles and treatments to their rooms and offices. For example, people may wish to change the color of the paint in their room or office or hang wallpaper.

One simple and relatively inexpensive way in which a person may add distinctive decorative accents to their environment is by placing a decorative frame or surround around electrical cover plates such as light switch plates and the like. Decorative surrounds are typically made of plastic or wooden molding, and they have the appearance of a picture frame. The decorative surround may be painted or have a surface treatment that provides a unique and pleasing aesthetic effect.

Decorative surrounds typically are adhered to the wall around the electrical cover plate by adhesive means. Usually, the adhesive means comprises a layer of adhesive that is protected by a peel-off cover. The layer of adhesive may be provided as a foam backup strip. The foam strip enables the surround to be mounted securely to a wall with an uneven or textured surface.

One of the drawbacks associated with presently existing surrounds is associated with their being affixed by adhesive to the wall. While some people do not mind sticking surrounds to the wall, other people would prefer not to. After the surround is adhered to the wall, it may not be removed without damaging the wall.

It is an object of the present invention to provide a decorative frame for a cover plate that may be mounted without adhering the frame directly to the wall.

SUMMARY OF THE INVENTION

The present application provides a decorative article for mounting about a wall mounted electrical cover plate of a switch or receptacle. The decorative article includes a frame having an inner periphery smaller than the cover plate and an outer periphery larger than the cover plate. The inner periphery defines a central opening. The frame includes a channel extending outwardly of the inner periphery. The channel has a depth substantially equal to the thickness of the cover plate and the channel has an outer periphery substantially the same size as the cover plate. The frame is thus capable of surrounding the cover plate with the switch or receptacle being accessible through the central opening.

An adhesive strip is affixed to the frame so that the frame may be adhered directly to the wall around the cover plate or to a back plate positioned between the cover plate and the wall. The back plate has an inner periphery smaller than the cover plate and an outer periphery larger than the cover plate. The cover plate is trapped in the channel between the frame and the back plate.

DESCRIPTION OF THE PREFERRED EMBODIMENT

Figure 1:
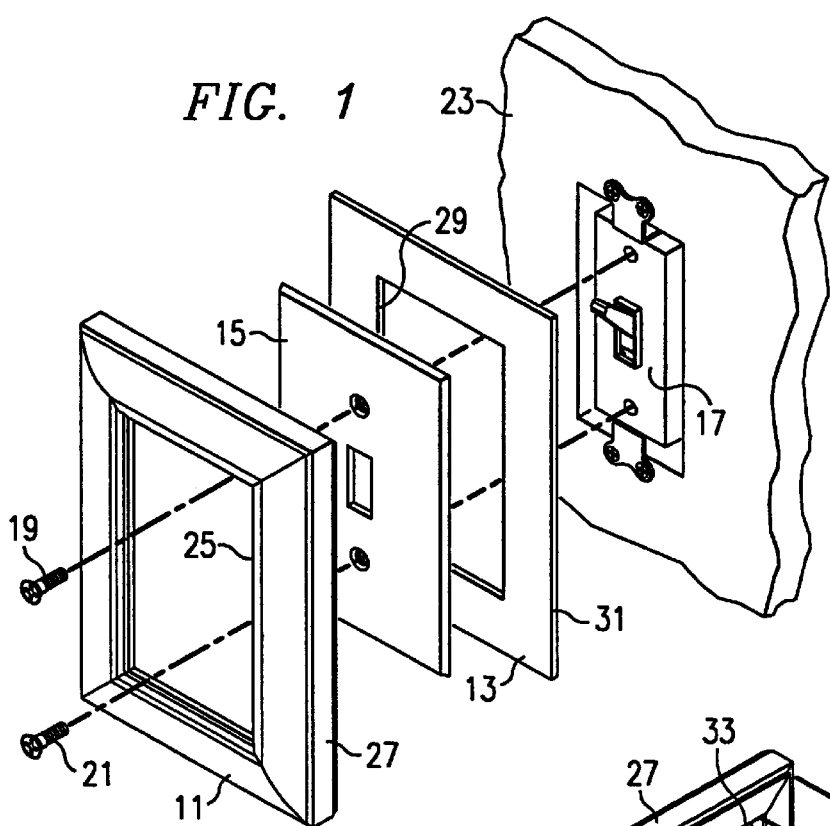
FIG. 1 is an exploded front view of the decorative article of the present invention used in connection with a wall mounted switch and switch plate.

Referring now to the drawing, the decorative article of the present invention includes a frame 11 and back plate 13. Frame 11 is preferably fabricated from miter-cut wooden, plastic, or metal molding, and it generally has the appearance of a picture frame. Alternatively, frame 11 may be a one-piece molded, cast, or machined article. Frame 11 preferable has a decorative or aesthetically pleasing surface treatment. As shown in the figures, frame 11 has a curved front surface, which may be painted.

Frame 11 and back plate 13 are adapted for use with a cover plate such as a switch plate 15. Switch plate 15 is attached or attachable to a switch 17 by screws 19 and 21. Switch 17 is attached to a wall 23 in the manner well known to those skilled in the art. Electrical cover plates are generally rectangular and come in standard sizes. For example, a single toggle switch plate 15 is about 2–3/4 inches wide by 4–1/2 inches long, and about 3/16 inch thick. Frame 11 includes a rectangular inner periphery 25 that is smaller than switch plate 15. For example, in the preferred embodiment, the inner periphery 25 of frame 11 is about 2–1/4 inches wide by about 4 inches long. Frame 11 has an outer periphery 27, the size of which is determined by the width of the molding used to make frame 11. Inner periphery 25 of frame 11 forms a central opening through which switch plate 15 and the toggle of switch 17 are accessible. Therefore, the decorative frame 11 is adapted to border the cover plate 15 such that the frame 11 substantially follows a contour of the outer periphery of the cover plate 15 and such that a majority of a front surface of the cover plate 15 is not covered by the frame 11 when the frame 11 is operably installed.

Back plate 13 includes an inner periphery 29 and an outer periphery 31. Inner periphery 29 of back plate 13 is smaller than switch plate 15. Preferably, inner periphery 29 and outer periphery 31 of back plate 13 are the same size as inner periphery 25 and outer periphery 27, respectively, of frame 11. Back plate 13 is made from a relatively thin sheet of, preferable clear, plastic material. Since, back plate 13 is installed between switch plate 15 and wall 23, the thinness of back plate 13 prevents the toggle of switch 17 from being recessed too far into switch plate 15. Back plate 13 is preferable clear so as to be substantially invisible when it is installed.

Figure 2:
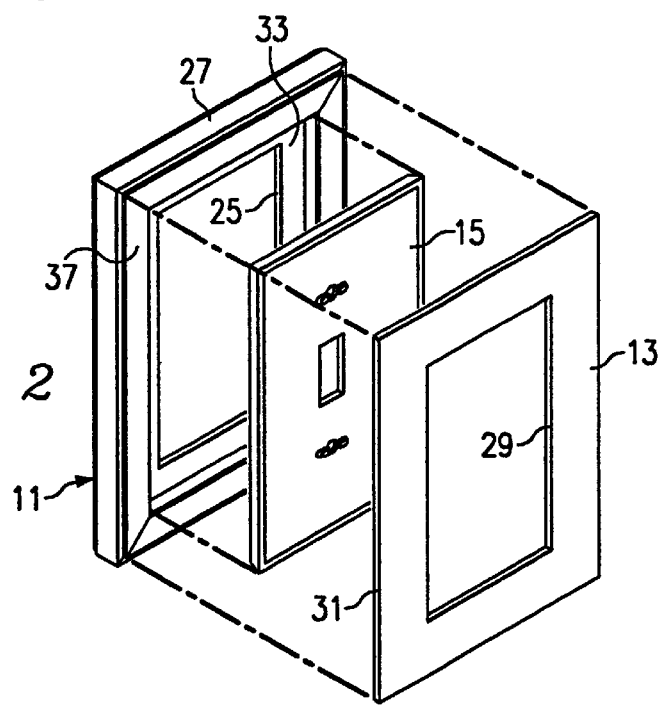
FIG. 2 is an exploded back view of the decorative article of the present invention and a switch plate.
Figure 3:
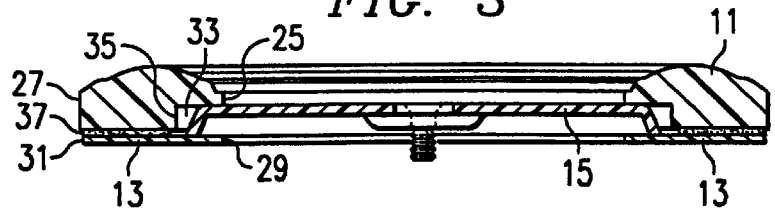
FIG. 3 is a sectional view showing a switch plate trapped between the frame and back plate of the present invention.

As best shown in FIGS. 2 and 3, frame 11 includes a two-sided rectangular channel 33 extending around inner periphery 25. Channel 33 extends outwardly from inner periphery 25 of frame 11 to define an outer periphery 35, slightly larger than switch plate 15. In the preferred embodiment, the outer periphery 35 of channel 33 is about 2–7/8 inches wide by about 4–5/8 inches long. Channel 35 has a depth about the same as or slightly less than the thickness of switch plate 15. In the preferred embodiment, channel 33 has a depth of about 5/32 inch. Thus, switch plate 15 fits within channel 33.

The back side of frame 11 has affixed thereto between outer periphery 35 of channel 33 and outer periphery 27 of frame 11 a rectangular adhesive strip 37. Preferably, adhesive strip 37 is formed from miter-cut lengths of two-sided adhesive foam tape. One side of adhesive strip 37 is adhered to the back side of frame 27. The other side of adhesive strip 37 is preferably protected by a peel-off cover (not shown) prior to use. Adhesive strip 37 preferable has a thickness slightly larger than the difference between the thickness of switch plate 15 and the depth of channel 33. In the illustrated example, adhesive strip 37 is about 1/16-inch thick.

Frame 11 with adhesive strip 37 affixed thereto and back plate 13 are preferably packaged and sold together as a kit. The purchaser of the kit may either adhere frame 11 directly to wall 23 around switch plate 15, as in the prior art, and simply discard back plate 13. Alternatively, if the purchaser does not wish to stick frame 11 to wall 23, the purchaser may temporarily remove switch plate 15 from wall 23 and place switch plate 15 into channel 33. Then, the purchaser may adhere back plate 13 to adhesive strip 37 to trap switch plate 15, between frame 11 and back plate 13, as shown in FIG. 3. Then, the purchaser may reinstall cover plate 15 with frame 11 affixed thereabout.

From the foregoing, it may be seen that the present invention overcomes the shortcomings of the prior art. The present invention gives a purchaser the option of installing a decorative frame around a cover plate without sticking the frame to the wall.

While the present invention has been illustrated and described with reference to a presently preferred embodiment, those skilled in the art will recognize alternative arrangements, given the benefit of this disclosure. Dimensions, measurements, and materials are provided only for purposes of illustration. The spirit and scope of the invention shall be determined with reference to the claims.

What is claimed is:

1. A decorative article for mounting about a wall-mounted electrical component that is on a wall, comprising:
   a cover plate for said wall-mounted electrical component;
   a back plate having an outer periphery larger than an outer periphery of said cover plate and having an inner periphery smaller than said outer periphery of said cover plate;
   a first attachment means for affixing said cover plate and said back plate to said wall-mounted electrical component such that when said cover plate is operably installed on said wall-mounted electrical component, said first attachment means projects through said cover plate and sandwiches said back plate between said cover plate and said wall;
   a decorative frame adapted to border said cover plate such that said frame substantially follows a contour of said outer periphery of said cover plate and such that a majority of a front surface of said cover plate is not covered by said frame when said frame is operably installed; and
   a second attachment means for affixing said frame directly to said back plate when said frame is operably installed such that said frame does not directly attach to said wall nor said cover plate, wherein said second attachment means is different than said first attachment means.

2. A decorative article in accordance with claim 1, wherein said contour of said outer periphery of said cover plate, said frame, and said outer periphery of said back plate are generally rectangular shaped.

3. A decorative article in accordance with claim 1, wherein said first attachment means is a pair of screws adapted to thread into said wall-mounted electrical component, and said second attachment means is an adhesive element.

4. A decorative article in accordance with claim 1, wherein said frame has a front surface comprising a decorative feature.

5. A decorative article in accordance with claim 1, wherein said frame and said back plate are generally rectangular shaped.

6. A decorative article in accordance with claim 1, wherein said second attachment means comprises a two-sided adhesive foam strip.

7. A decorative article in accordance with claim 1, wherein said second attachment means comprises a tape strip having adhesive on both sides.

8. A decorative article in accordance with claim 1, wherein said outer periphery of said back plate is substantially the same size and shape as said outer periphery of said frame.

9. A decorative article in accordance with claim 1, wherein said frame has a channel region extending outwardly from said inner periphery of said frame, and said channel region having an outer periphery greater than said outer periphery of said cover plate, such that said cover plate can fit within said frame.

10. A decorative article for mounting about a wall-mounted electrical cover plate, comprising:
    a decorative frame having an inner periphery smaller than an outer periphery of said cover plate, and having an outer periphery larger than said outer periphery of said cover plate, said inner periphery of said frame defining a central opening such that a majority of a front surface of said cover plate is not covered by said frame when said frame is mounted about said cover plate;
    a back plate having an inner periphery smaller than said outer periphery of said cover plate and having an outer periphery larger than said outer periphery of said cover plate, such that said back plate is adapted to mount between said cover plate and a wall when said cover plate is operably installed; and
    an adhesive element adapted to affix said frame directly to said back plate such that said frame is not directly affixed to said cover plate nor said wall.

11. A decorative article in accordance with claim 10, wherein said back plate is sandwiched between and held between said cover plate and said wall by screws that hold said cover plate in place when said back plate and said cover plate are operably installed.

12. A decorative article in accordance with claim 10, wherein said frame and said back plate are generally rectangular shaped.

13. A kit providing a decorative article adapted to mount about a wall-mounted electrical cover plate, comprising:
    a decorative frame having an inner periphery smaller than an outer periphery of said cover plate and having an outer periphery larger than said outer periphery of said cover plate, said inner periphery of said frame defining a central opening adapted to allow a majority of a front surface of said cover plate to be exposed;
    a back plate provided with said frame, said back plate having an inner periphery smaller than said outer periphery of said cover plate and having an outer periphery larger than said outer periphery of said cover plate; and an adhesive strip affixed to one of said frame and said back plate, and adapted to be affixed to the other of said frame and said back plate such that said frame is directly affixed to said back plate, but not directly affixed to said cover plate nor a wall.

14. A kit in accordance with claim 13, wherein said frame comprises:

a front surface extending from said inner periphery of said frame to said outer periphery of said frame; and a back surface.

15. A kit in accordance with claim 14, wherein said adhesive strip comprises a two-sided adhesive foam strip affixed to said back surface of said frame.

16. A kit in accordance with claim 13, wherein said outer periphery of said back plate is substantially the same size and shape as said outer periphery of said frame.

17. A kit in accordance with claim 13, wherein said frame and said back plate are generally rectangular shaped.

* * * * *